(12) United States Patent
Setnor

(10) Patent No.: US 9,010,946 B1
(45) Date of Patent: Apr. 21, 2015

(54) AUTOMOBILE MIRROR CONTROL SYSTEM

(71) Applicant: Seymour Setnor, Weston, FL (US)

(72) Inventor: Seymour Setnor, Weston, FL (US)

(73) Assignee: Seymour Setnor, Weston, FL (US)

( * ) Notice: Subject to any disclaimer, the term of this patent is extended or adjusted under 35 U.S.C. 154(b) by 0 days.

(21) Appl. No.: 14/301,049

(22) Filed: Jun. 10, 2014

(51) Int. Cl.
*G02B 5/08* (2006.01)
*G02B 7/18* (2006.01)
*B60R 1/00* (2006.01)
*G02B 7/182* (2006.01)

(52) U.S. Cl.
CPC ............... *B60R 1/006* (2013.01); *G02B 7/182* (2013.01)

(58) Field of Classification Search
USPC ......................................... 359/843, 872–875
See application file for complete search history.

(56) References Cited

U.S. PATENT DOCUMENTS

| | | | |
|---|---|---|---|
| 2,026,082 A | 12/1935 | Darrow | |
| 4,249,086 A | 2/1981 | Mochizuki | |
| 4,428,649 A | 1/1984 | Main et al. | |
| 4,698,571 A | 10/1987 | Mizuta et al. | |
| 4,786,156 A | 11/1988 | Kotani et al. | |
| 4,816,662 A | 3/1989 | Kyoden | |
| 4,866,221 A | 9/1989 | Obermann et al. | |
| 5,659,423 A | 8/1997 | Schierbeek et al. | |
| 5,717,387 A | 2/1998 | Suman et al. | |
| 5,886,838 A | 3/1999 | Kuramoto | |
| 5,939,796 A | 8/1999 | Tomassi et al. | |
| 6,648,477 B2 | 11/2003 | Hutzel et al. | |
| 7,262,375 B2 | 8/2007 | Sakai | |
| 7,439,460 B1 | 10/2008 | Watson | |
| 7,571,041 B2 | 8/2009 | Lee et al. | |
| 7,885,743 B2 | 2/2011 | Noro et al. | |
| 8,044,776 B2 | 10/2011 | Schofield et al. | |
| 8,044,777 B2 | 10/2011 | Drummond et al. | |
| 8,090,506 B2 | 1/2012 | Noro et al. | |
| 8,124,893 B2 | 2/2012 | Krishnan et al. | |
| 8,143,820 B2 | 3/2012 | Sakuma | |
| 2003/0034752 A1* | 2/2003 | Kramer et al. | 318/560 |
| 2004/0075921 A1* | 4/2004 | Evans et al. | 359/872 |

(Continued)

FOREIGN PATENT DOCUMENTS

| | | |
|---|---|---|
| CN | 101954885 | 1/2011 |
| EP | 0 603 509 | 6/1994 |

(Continued)

OTHER PUBLICATIONS

Williams et al., Control of an automotive shape memory alloy mirror actuator:, Mechatronics, Dec. 31, 2010, vol. 20, pp. 527-534, Elsevier Ltd.

*Primary Examiner* — Ricky Mack
*Assistant Examiner* — Mustak Choudhury
(74) *Attorney, Agent, or Firm* — Feldman Gale, P.A.; A. Robert Weaver

(57) ABSTRACT

A control system for mirror in a vehicle as well as a method for controlling the side minors of a vehicle are disclosed. The control system may include a processor module and a memory module as well as a control console. The control console may include a minor toggle switch, a minor control switch, and two sets of memory recall switches. The first set of memory recall switches may be associated with set side mirror positions in a first operation state of the vehicle, which could for instance occur when the vehicle is operating in a drive gear. The second set of memory recall switches may be associated with set side minor positions in a second operation state of the vehicle, which could for instance occur when the vehicle is operating in a reverse gear.

6 Claims, 3 Drawing Sheets

(56) References Cited

U.S. PATENT DOCUMENTS

2007/0030581 A1 2/2007 Wang
2008/0278834 A1* 11/2008 Noro et al. .................... 359/872
2011/0085255 A1 4/2011 Koo

FOREIGN PATENT DOCUMENTS

| EP | 2 072 335 | 6/2009 |
| WO | 2007053710 | 5/2007 |

* cited by examiner

US 9,010,946 B1

AUTOMOBILE MIRROR CONTROL SYSTEM

FIELD OF THE DISCLOSURE

This disclosure relates generally to control systems for mirrors in automobiles.

BACKGROUND

Rear view and side view mirrors are common features in a variety of automobiles. In addition to one mirror typically located within the passenger cabin, usually towards the ceiling of the cabin and positionable so that a driver may view the environment through the rear window of the automobile, additional mirrors may be located on the side of the automobile and exterior to the passenger cabin. In some automobiles, one side-view mirror may be located on the exterior of the vehicle proximate to the driver-side door, while another nearly identical side-view mirror may be located on the exterior of the vehicle proximate to the passenger-side door.

Current control systems are provided which allow the driver to electronically adjust the orientation of the side-view mirrors provided on the vehicle. The side mirrors may be adjusted through manipulation of a control console. FIG. 1 illustrates a known control console 10 for adjusting side-view mirrors in an automobile. Control console 10 includes a mirror toggle switch 20, mirror control switch 30, at least one memory recall switch 40, and a memory set switch 50. Mirror toggle switch 20 allows the operator to determine which side mirror, the drive-side or the passenger-side, should be controlled. Once a mirror is selected, mirror control switch 30 may then be utilized to adjust the mirror either vertically or horizontally, as desired by the operator. Control console 10 may further include memory features. For instance, a plurality of memory switches 40 may be provided, each of which is associated with a set position of the side-view mirrors. In this regard, actuation of a first memory switch 40 may position the side-view mirrors to a set first position, while actuation of a second memory switch 40 may change the position of the side-view mirror to a second position. The memory switches 40 may be recalibrated by manipulating memory set switch 50 in conjunction with memory switches 40. For instance, an operator may set the side-view mirrors to a unique orientation and then actuate the memory set switch 50 simultaneously with one of the memory switches 40, thereby associating that mirror orientation with that memory switch 40.

While memory switches 40 may be provided for orientating the mirrors for operation of the vehicle while the vehicle is in forward drive gears, the orientation of the mirrors as the vehicle transmission switches to a reverse gear may be preset by the automobile manufacturer. In this regard, when the operator of the vehicle switches from forward to reverse gears, the side mirrors may automatically re-orient themselves to an orientation preset by the automobile manufacturer based on the driving position setting. A typical preset orientation results in sharply tilting the mirrors downward so as to view very low objects, such as a curb adjacent to the vehicle.

SUMMARY OF THE DISCLOSURE

A control system for mirrors in a vehicle is disclosed herein, and the control system may include a control unit including a process module and a memory module, and a control console including a mirror toggle switch, a mirror control switch, a first set of memory recall switches, and a second set of memory recall switches. The first set of memory recall switches may be associated with set side mirror positions in a first operation state of the vehicle, and the second set of memory recall switches may be associated with set side mirror positions in a second operation state of the vehicle.

Also disclosed herein is a method for controlling the side mirrors of a vehicle, the method may include detecting the operational state of the vehicle, identifying the associated memory state, adjusting the side mirrors of the vehicle to an orientation associated with the identified memory state, and providing a continuous loop feedback to determine changes in either the operational state or the memory state. The memory state may be changeable by actuating either a drive memory recall switch if the operational state of the vehicle if the operational state of the vehicle is that the vehicle is in a drive gear, or by actuating a reverse memory recall switch if the operational state of the vehicle is that the vehicle is in a reverse gear.

DETAILED DESCRIPTION

Figure 1:
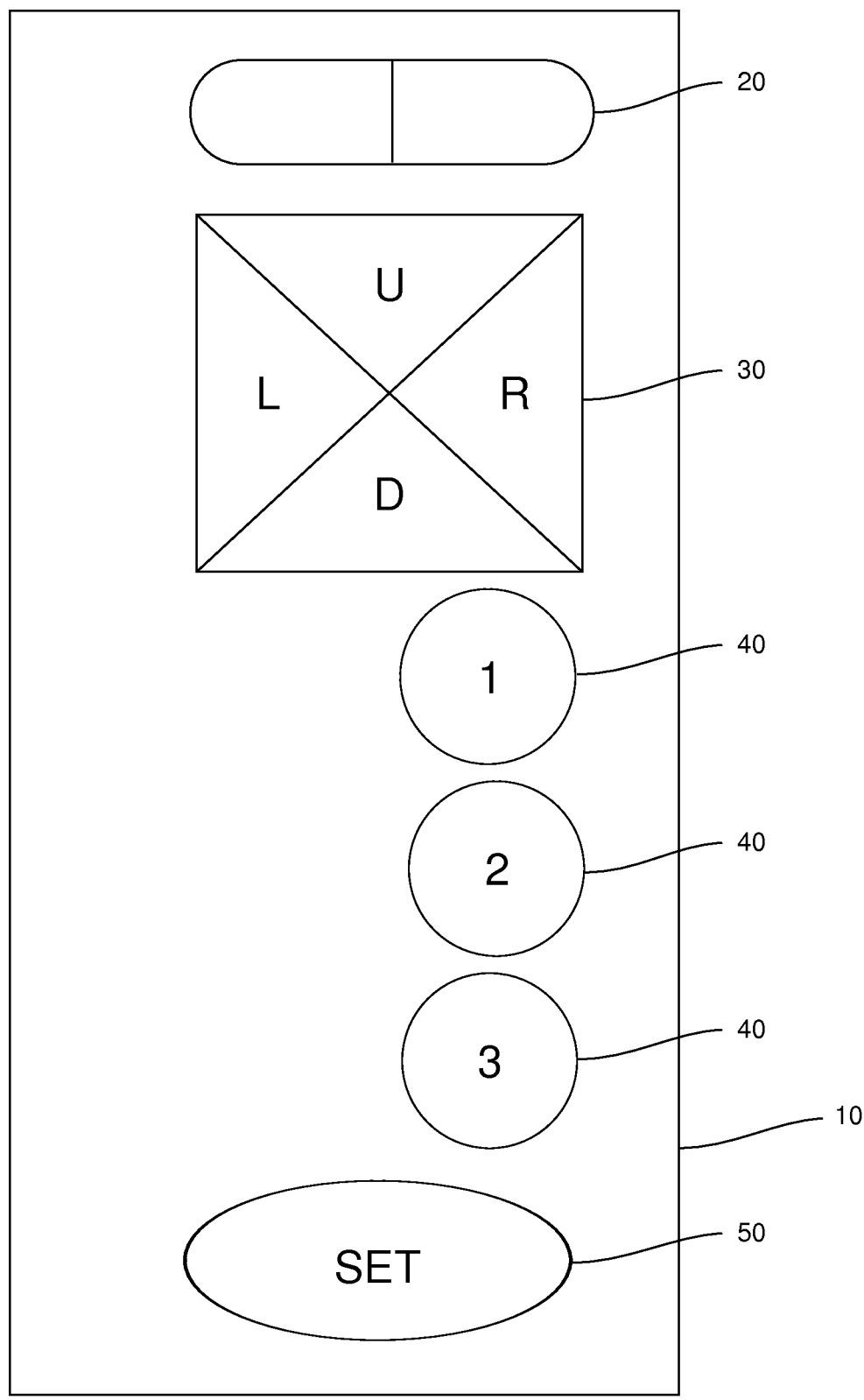
FIG. 1 is identified as Prior Art and illustrates a known control console for adjusting side-view mirrors in an automobile.

The following detailed description and the appended drawings describe and illustrate some embodiments of the invention for the purpose of enabling one of ordinary skill in the relevant art to make and use the invention. As such, the detailed description and illustration of these embodiments are purely illustrative in nature and are in no way intended to limit the scope of the invention, or its protection, in any manner. It should also be understood that the drawings are not to scale and in certain instances details have been omitted, which are not necessary for an understanding of the present invention, such as details of fabrication and assembly. In the accompanying drawings, like numerals represent like components.

In one embodiment of the disclosure, A control system for mirrors in a vehicle is provided, and the control system may include a control unit including a process module and a memory module, and a control console including a mirror toggle switch, a mirror control switch, a first set of memory recall switches, and a second set of memory recall switches. The first set of memory recall switches may be associated with set side mirror positions in a first operation state of the vehicle, and the second set of memory recall switches may be associated with set side mirror positions in a second operation state of the vehicle.

In further embodiments of the control system, the first set of memory recall switches may share a common first shape, and the second set of memory recall switches may share a common second shape. The first operation state of the vehicle may occur when the vehicle is operating in a drive gear, and the second operation state of the vehicle may occur when the vehicle is operating in a reverse gear. The control console may further include a memory set switch wherein actuation of the memory set switch in conjunction with one of either the first or second set of memory recall switches operates to associate the instant mirror orientation with the respective memory recall switch. The control may further include an additional memory set switch, and the memory set switch is actuatable in associated with the first set of memory recall switches, and the additional memory set switch is actuatable in association with the second set of memory recall switches. The first set of memory recall switches may include at least three recall switches, and the second set of memory recall switches may include at least three switches.

A method for controlling the side mirrors of a vehicle is further disclosed in accordance with the disclosure, the method may include detecting the operational state of the vehicle, identifying the associated memory state, adjusting the side mirrors of the vehicle to an orientation associated with the identified memory state, and providing a continuous loop feedback to determine changes in either the operational state or the memory state. The memory state may be changeable by actuating either a drive memory recall switch if the operational state of the vehicle if the operational state of the vehicle is that the vehicle is in a drive gear, or by actuating a reverse memory recall switch if the operational state of the vehicle is that the vehicle is in a reverse gear.

Figure 2:
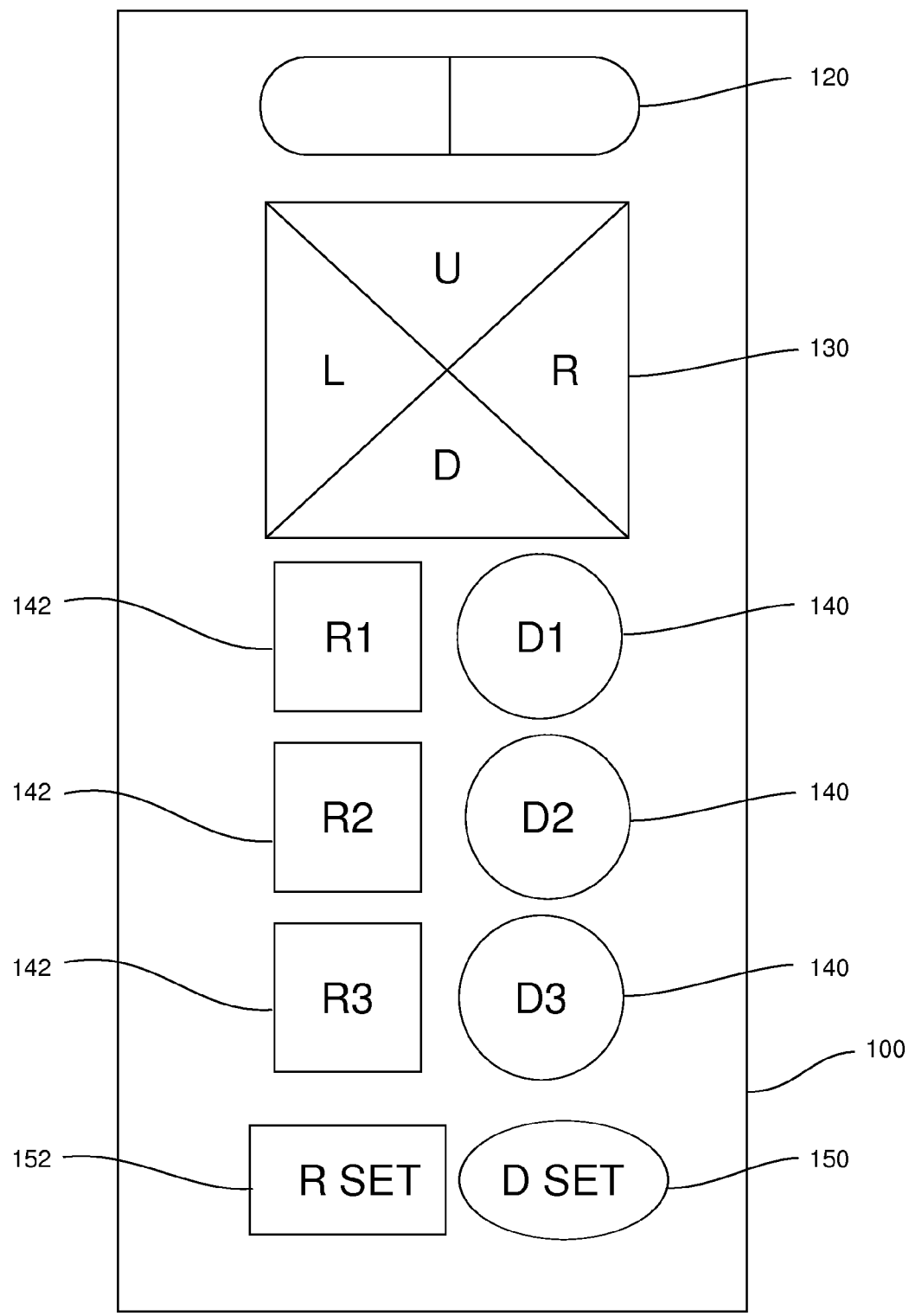
FIG. 2 illustrates a control console for adjusting side-view mirrors in accordance with the instant disclosure.

With reference to FIG. 2, a control console 100 is provided for controlling mirrors in an automobile in accordance with a control system 200 as further described herein. Control console 100 may include a mirror toggle switch 120, a mirror control switch 130, a plurality of memory recall switches 140/142, and a pair of memory set switches 150/152. Minor toggle switch 120 may allow the operator to determine which side mirror, the drive-side or the passenger-side, should be controlled. Once a mirror is selected, mirror control switch 130 may then be utilized to adjust the mirror either vertically or horizontally, as desired by the operator.

Control console 100 may further include distinct memory features depending on whether the vehicle is operating in a drive gear or a reverse a gear. A first set of memory switches 140 may be provided to memorize set minor orientations while the vehicle is in drive, while a second set of memory switches 142 may be provided to memorize set minor orientations while the vehicle is in reverse. For instance, when an operator places the vehicle in a drive gear, the side mirrors may automatically transition to a first drive orientation as memorized within control system 200 and associated with a first drive memory switch 140. When the operator wishes to transition to a reverse gear, the side mirrors may then automatically transition to a first reverse orientation as memorized within control system 200 and associated with a first reverse memory switch 142. For any number of reasons, including a change of operator or change of driving conditions, it may be desirable to select an alternative memory-set orientation of the side minors. Accordingly, the operator may select a second drive memory switch 140 thereby changing the orientation of the side mirrors to a second orientation while the vehicle is in drive. The operator may similarly select a second reverse memory switch 142 thereby changing the orientation of the side mirrors to a second orientation while the vehicle is in reverse. The operator may therefore orient the side mirrors as appropriate for the operator and driving condition.

A side mirror orientation may be set and thereby associated with one of the memory switches 140/142 through utilization of a memory set switch 150/152. In some embodiments, a drive memory set switch 150 is provided and may be utilized for setting drive memory recall switches 140, while a reverse memory set switch 152 is provided and may be utilized for setting reverse memory recall switches 142. In another embodiment a single memory set switch may be provided for setting either drive or reverse memory recall switches 140/142. A memory recall switch 140/142 may be set, for instance, by mutually pressing memory set switch 150/152 along with the desired memory recall switch 140/142. Drive set of memory switches 140 may be constructed with a distinct shape or dimension compared to reverse set of memory switches 142. The distinct shape may facilitate the operator to determine the appropriate memory recall switch 140/142 to actuate by touch without needing to actually look at the switch.

Figure 3:
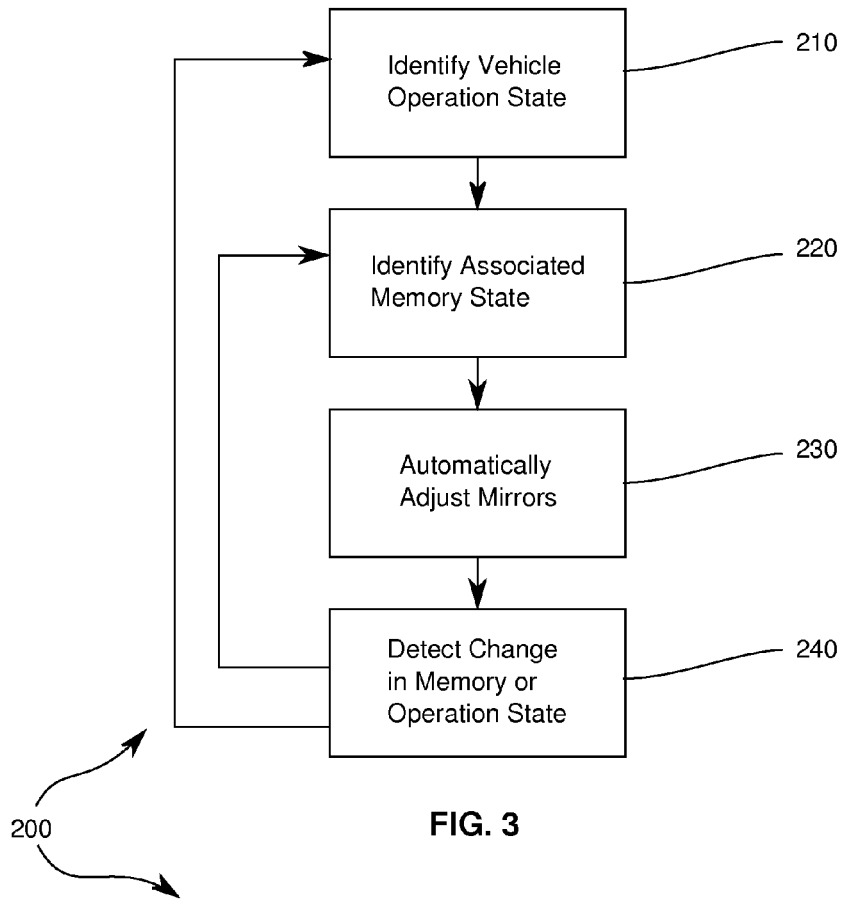
FIG. 3 illustrates an operational flow chart for a control system in accordance with the instant disclosure.

FIG. 3 illustrates an operational flow chart for control system 200 in accordance with an embodiment of the disclosure. Control system 200 may initially detect the operational state of the vehicle 210, which may include determining whether the vehicle is in drive, reverse, or park. In this regard, communication with other components of the vehicle, including for instance the transmission, may be required. Next, control system 200 may identify the associated memory state 220 after determining the vehicle operation state. A default memory state may be initially set by the vehicle manufacturer. The initial operation state may, alternatively, be the last set memory state by the operator considering the current operational state of the vehicle. Having determined the memory state, the control system 200 may then automatically adjust side minors 230 in accordance with the memory state. Control system 200 may then continuously loop feedback 240 to determine changes in either operational state 210, which may occur for instance when the operator changes between a drive gear and a reverse gear, or a memory state 220, which may occur for instance when the operator actuates a memory recall switch 140/142.

Figure 4:
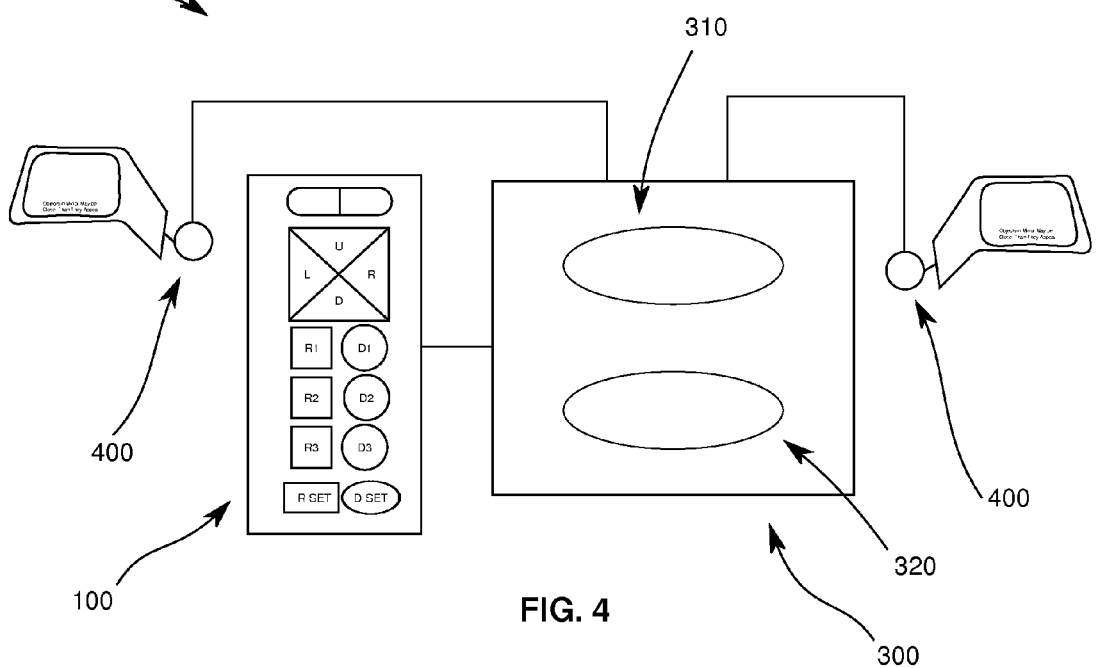
FIG. 4 illustrates a control system in accordance with the instant disclosure.

FIG. 4 illustrates components of control system 200 in accordance with an embodiment of the disclosure. A control console 100 may be provided, in accordance with the disclosure as previously described herein. Control console 100 may be connected and communicable with a vehicle control unit 300, which may include a processor module 310 and a a memory module 320. Control unit 300 may operate to conduct the functioning of control system 200, including the controlling steps described in the operational flow chart of FIG. 3. All known or to be developed computer operating components for processor module 310 and memory module 320 are contemplated within the disclosure. Control unit 300 may thereby operate to control one or more vehicle side mirrors 400, thereby permitting adjustment of minor orientation as described herein.

It should be understood and appreciated that vehicle or automobile, as used herein, encompasses any known or to be developed motor vehicle having a drive and reverse gear including, but not limited to, cars, trucks, all terrain vehicles, motorized tricycles, boats, and airplanes to name a few examples.

The descriptions set forth above are meant to be illustrative and not limiting. Various modifications of the invention, in addition to those described herein, will be apparent to those skilled in the art from the foregoing description. Such modifications are also intended to fall within the scope of the concepts described herein. The disclosures of each patent, patent application and publication cited or described in this document are hereby incorporated herein by reference, in their entireties.

The foregoing description of possible implementations consistent with the present disclosure does not represent a comprehensive list of all such implementations or all variations of the implementations described. The description of some implementation should not be construed as an intent to exclude other implementations. For example, artisans will understand how to implement the invention in many other ways, using equivalents and alternatives that do not depart from the scope of the invention. Moreover, unless indicated to the contrary in the preceding description, none of the components described in the implementations are essential to the invention. It is thus intended that the embodiments disclosed in the specification be considered as illustrative, with a true scope and spirit of the invention being indicated by the following claims.

The invention claimed is:

1. A control system for mirrors in a vehicle, the control system comprising:
    a control unit including a processor module and a memory module; and
    a control console including
        a mirror toggle switch,
        a mirror control switch,
        a first set of memory recall switches, and
        a second set of memory recall switches,
    wherein the first set of memory recall switches are associated with set side mirror positions in a first operation state of the vehicle, and the second set of memory recall switches are associated with set side mirror positions in a second operation state of the vehicle,
    wherein the first set of memory recall switches includes at least three recall switches, and the second set of memory recall switches includes at least three switches.

2. The control system of claim 1, wherein the first set of memory recall switches share a common first shape, and the second set of memory recall switches share a common second shape.

3. The control system of claim 1, wherein the first operation state of the vehicle occurs when the vehicle is operating in a drive gear, and the second operation state of the vehicle occurs when the vehicle is operating in a reverse gear.

4. The control system of claim 1, the control console further including a memory set switch, wherein actuation of the memory set switch in conjunction with one of either the first or second set of memory recall switches operates to associate the instant mirror orientation with the respective memory recall switch.

5. The control system of claim 4, the control console further including an additional memory set switch, wherein the memory set switch is actuatable in association with the first set of memory recall switches, and the additional memory set switch is actuatable in association with the second set of memory recall switches.

6. A method for controlling the side mirrors of a vehicle, the method comprising:
    detecting an operational state of the vehicle;
    identifying the associated memory state;
    adjusting the side mirrors of the vehicle to an orientation associated with the identified memory state; and
    providing a continuous loop feedback to determine changes in either the operational state or the memory state,
    wherein the operational state of the vehicle is determined whether the vehicle is in a drive gear or a reverse gear, and
    wherein the memory state is changeable by actuating either one of at least three drive memory recall switches if the operational state of the vehicle is that the vehicle is in a drive gear, or by actuating one of at least three reverse memory recall switches if the operational state of the vehicle is that the vehicle in a reverse gear.

\* \* \* \* \*

UNITED STATES PATENT AND TRADEMARK OFFICE
CERTIFICATE OF CORRECTION

PATENT NO.        : 9,010,946 B1
APPLICATION NO.   : 14/301049
DATED             : April 21, 2015
INVENTOR(S)       : Seymour Setnor It is certified that error appears in the above-identified patent and that said Letters Patent is hereby corrected as shown below:

On the Title Page

Abstract, line 2, please replace "minors" with --mirrors--.

Abstract, line 5, please replace "minor toggle switch, a minor control" with --mirror toggle switch, a mirror control--.

Abstract, line 11, please replace "side minor" with --side mirror--.

In the Specification

Column 1, line 11, please replace "one minor" with --one mirror--.

Column 1, line 17, please replace "side-view minor" with --side-view mirror--.

Column 1, line 19, please replace "side-view minor" with --side-view mirror--.

Column 1, line 23, please replace "minors provided" with --mirrors provided--.

Column 1, line 26, please replace "minors in" with --mirrors in--.

Column 1, line 27, please replace "minor control switch" with --mirror control switch--.

Column 1, line 31, please replace "minor control switch" with --mirror control switch--.

Column 1, line 32, please replace "minor either" with --mirror either--.

Column 1, line 40, please replace "side-view minor" with --side-view mirror--.

Signed and Sealed this
Sixth Day of October, 2015

Michelle K. Lee
*Director of the United States Patent and Trademark Office*

CERTIFICATE OF CORRECTION (continued)
U.S. Pat. No. 9,010,946 B1

Column 1, line 49, please replace "the minors" with --the mirrors--.

Column 1, line 53, please replace "side-minors" with --side mirrors--.

Column 1, line 65, please replace "a minor toggle switch, a minor" with --a mirror toggle switch, a mirror--.

Column 2, line 6, please replace "minors of" with --mirrors of--.

Column 2, line 8, please replace "side minors" with --side mirrors--.

Column 3, line 25, please replace "Minor" with --Mirror--.

Column 3, line 35, please replace "minor orientations" with --mirror orientations--.

Column 3, line 37, please replace "set minor" with --set mirror--.

Column 3, line 49, please replace "side minors." with --side mirrors.--.

Column 4, line 22, please replace "side minors" with --side mirrors--.

Column 4, line 42, please replace "of minor" with --of mirror--.